US008534066B2

(12) United States Patent  (10) Patent No.: US 8,534,066 B2
Cavallo et al.  (45) Date of Patent: Sep. 17, 2013

(54) TWO-STAGE TURBOCHARGED ENGINE SYSTEM

(75) Inventors: Roberto Cavallo, Rivoli (IT); Roberto Golisano, Rivoli (IT); Gianmarco Boretto, Nichelino (IT); Eugenio Manta, Valdellatorre (IT)

(73) Assignee: GM Global Technology Operations LLC, Detroit, MI (US)

( * ) Notice: Subject to any disclaimer, the term of this patent is extended or adjusted under 35 U.S.C. 154(b) by 357 days.

(21) Appl. No.: 12/860,264

(22) Filed: Aug. 20, 2010

(65) Prior Publication Data

US 2011/0041497 A1  Feb. 24, 2011

(30) Foreign Application Priority Data

Aug. 20, 2009 (GB) .................................. 0914568.1

(51) Int. Cl.
| F02B 33/44 | (2006.01) |
| F02B 33/00 | (2006.01) |
| F02B 37/00 | (2006.01) |
| F02B 37/013 | (2006.01) |
| F01D 17/10 | (2006.01) |
| F01D 25/04 | (2006.01) |
| F01D 5/10 | (2006.01) |
| F01D 5/16 | (2006.01) |
| F04D 29/66 | (2006.01) |

(52) U.S. Cl.
USPC .............................. 60/612; 123/562; 415/119

(58) Field of Classification Search
USPC ............ 60/612; 123/562; 415/119, 203–204
See application file for complete search history.

(56) References Cited

U.S. PATENT DOCUMENTS

| 5,142,866 A * | 9/1992 | Yanagihara et al. ......... 60/605.2 |
| 6,802,184 B2 * | 10/2004 | Huter et al. ..................... 60/612 |
| 7,302,800 B2 * | 12/2007 | Klingel ............................ 60/612 |
| 7,426,830 B2 * | 9/2008 | Schorn et al. .................... 60/612 |
| 7,703,284 B2 * | 4/2010 | Becker et al. ................... 60/612 |
| 8,182,206 B2 * | 5/2012 | Cavagnaro et al. ........... 415/119 |
| 8,307,649 B2 * | 11/2012 | Axelsson et al. ............... 60/612 |
| 2003/0159442 A1 * | 8/2003 | Huter et al. ..................... 60/612 |
| 2004/0040300 A1 * | 3/2004 | Klingel ............................ 60/612 |
| 2004/0134193 A1 * | 7/2004 | Klingel ............................ 60/612 |

(Continued)

FOREIGN PATENT DOCUMENTS

| EP | 1843019 A1 | 10/2007 |
| JP | 59082526 A * | 5/1984 |

(Continued)

*Primary Examiner* — Thai Ba Trieu

(74) *Attorney, Agent, or Firm* — Ingrassia Fisher & Lorenz, P.C.

(57) ABSTRACT

A two-stage turbocharged engine system is provided. The two-stage turbocharged engine system includes an internal combustion engine, a high-pressure turbocharger having a high-pressure turbine for rotating a high-pressure compressor through a connecting shaft, and a low-pressure turbocharger having a low-pressure turbine for rotating a low-pressure compressor by a connecting shaft. The two-stage turbocharged engine system also includes a low-pressure intake line for fluidly connecting the outlet of low-pressure compressor to the inlet of high-pressure compressor, a high-pressure intake line for fluidly connecting the outlet of high-pressure compressor to an air cooler, and a bypass device for selectively fluidly connecting a first branching point located in low-pressure intake line to a second branching point located in high-pressure intake line to thereby bypass the high-pressure compressor. The bypass device is located closer to the low-pressure compressor than to the high-pressure compressor.

15 Claims, 8 Drawing Sheets

(56) References Cited

U.S. PATENT DOCUMENTS

| | | | |
|---|---|---|---|
| 2006/0254274 A1* | 11/2006 | Kapich | 60/612 |
| 2007/0056283 A1* | 3/2007 | Klingel | 60/612 |
| 2007/0062188 A1* | 3/2007 | Fry et al. | 60/599 |
| 2007/0074513 A1* | 4/2007 | Lamb et al. | 60/612 |
| 2007/0175215 A1* | 8/2007 | Rowells | 60/605.2 |
| 2008/0173016 A1* | 7/2008 | Barthelet | 60/602 |
| 2008/0178591 A1* | 7/2008 | Axelsson et al. | 60/602 |
| 2009/0007563 A1* | 1/2009 | Cooper et al. | 60/600 |
| 2009/0031722 A1* | 2/2009 | An et al. | 60/612 |
| 2009/0038309 A1* | 2/2009 | Cocca et al. | 60/603 |
| 2009/0211246 A1* | 8/2009 | McEwan et al. | 60/602 |
| 2009/0223219 A1* | 9/2009 | Joergl et al. | 60/602 |
| 2009/0249786 A1* | 10/2009 | Garrett et al. | 60/612 |
| 2009/0252599 A1* | 10/2009 | Cavagnaro et al. | 415/119 |
| 2010/0095672 A1* | 4/2010 | An | 60/602 |
| 2011/0020108 A1* | 1/2011 | Axelsson et al. | 415/66 |
| 2011/0185724 A1* | 8/2011 | Barth et al. | 60/612 |

FOREIGN PATENT DOCUMENTS

| | | | |
|---|---|---|---|
| JP | 01244114 A | * | 9/1989 |
| JP | 02119627 A | * | 5/1990 |
| JP | 03117624 A | * | 5/1991 |
| JP | 2011231683 A | * | 11/2011 |
| WO | 2008015397 A1 | | 2/2008 |

* cited by examiner

TWO-STAGE TURBOCHARGED ENGINE SYSTEM

CROSS-REFERENCE TO RELATED APPLICATION

This application claims priority to British Patent Application No. 0914568.1, filed Aug. 20, 2009, which is incorporated herein by reference in its entirety.

TECHNICAL FIELD

The present invention relates to a two-stage turbocharged engine system.

BACKGROUND

Engine systems comprise an internal combustion engine equipped with intake manifold and exhaust manifold. Turbochargers are provided for charging air into the intake manifold at increased pressure. Turbochargers generally comprise a turbine which rotates a compressor through a connecting shaft. A typical turbocharged engine system is the so-called single-stage turbocharged system.

A single-stage turbocharged system comprises a single turbocharger arranged for charging air into the engine. The compressor of turbocharger is located in the intake line between the air inlet and the intake manifold, for compressing the airflow and for providing it to the engine. The turbine of turbocharger is located in the exhaust line between the exhaust manifold and the exhaust outlet, for converting the exhaust gas heat to torque which is used to drive the compressor. An air cooler is generally located in the intake line downstream the compressor of turbocharger, for cooling airflow before entering the intake manifold. A drawback of single-stage turbocharged engine systems is the well-known "turbo-lag".

In order to overcome "turbo-lag", has been proposed the so-called two-stage turbocharged engine systems, which comprise two sequential turbochargers which are selectively operated in accordance with engine speed and engine load. As a matter of fact, a two-stage turbocharged engine system comprises a high-pressure turbocharger and a low-pressure turbocharger, both having a compressor and a turbine. The compressor of high-pressure turbocharger is located in the intake line downstream the compressor of low-pressure turbocharger, relative to the flow direction.

It follows that the intake line comprises a low-pressure intake line for fluidly connecting the outlet of the low-pressure compressor to the inlet of high-pressure compressor, and a high-pressure intake line for fluidly connecting the outlet of high-pressure compressor to the inlet of the cooler device.

High-pressure turbocharger and low-pressure turbocharger are arranged such that at low engine speeds both turbochargers are used for charging air into the engine, and that as engine speed rises the high-pressure turbocharger is gradually disabled. The intake line comprises a bypass device arranged for allowing the airflow to bypass the high-pressure compressor when the high-pressure turbocharger is disabled. The bypass device generally comprises a bypass line for fluidly connecting low-pressure intake line directly to high-pressure intake line, and a valve which is located in said bypass line for opening or closing the passageway.

A two-stage turbocharged engine system of this kind is disclosed in EP 1 843 019. According to the specific embodiment shown in EP 1 843 019, high-pressure turbocharger and low-pressure turbocharger are aligned and have the respective turbines facing towards each other, so that the respective compressors are substantially located on opposite sides of the engine. In such an embodiment, the bypass device is located close to high-pressure compressor. As a matter of fact, the bypass line is arranged for locally bypassing the high-pressure compressor, and accordingly the valve is located nearby. For cost saving reasons, it would be useful to install the two-stage turbocharged engine system of EP 1 843 019 in the engine compartment of vehicles which are originally designed for receiving a single-stage turbocharged engine system.

However, actual implementation does not comply with the best practice for components arrangement in engine compartment, such that it involves some drawbacks which will be clarified later in the description.

At least one aim of the present invention is to improve the two-stage turbocharged engine system of EP 1 843 019, in order to make possible its installation in an engine compartment designed for a single-stage turbocharged engine system, overcoming the drawbacks of the actual implementation. Another aim of the present invention is to meet the goal with a rather simple, rational and inexpensive solution. In addition, other aims, desirable features, and characteristics will become apparent from the subsequent detailed description, and the appended claims, taken in conjunction with the accompanying drawings and this background.

SUMMARY

As a matter of fact, embodiments of the invention modify the above mentioned two-stage turbocharged engine system by locating the bypass device closer to low-pressure compressor than the high-pressure compressor. In this way, the engine compartment component arrangement become very similar for both the single-stage turbocharged engine system and the improved two-stage turbocharged engine system, thereby solving many vehicle integration drawbacks and achieving a reduction of vehicle integration cost. Further objects, features and advantages of the present invention will be apparent from the detailed description that follows, when considered together with the accompanying drawings.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
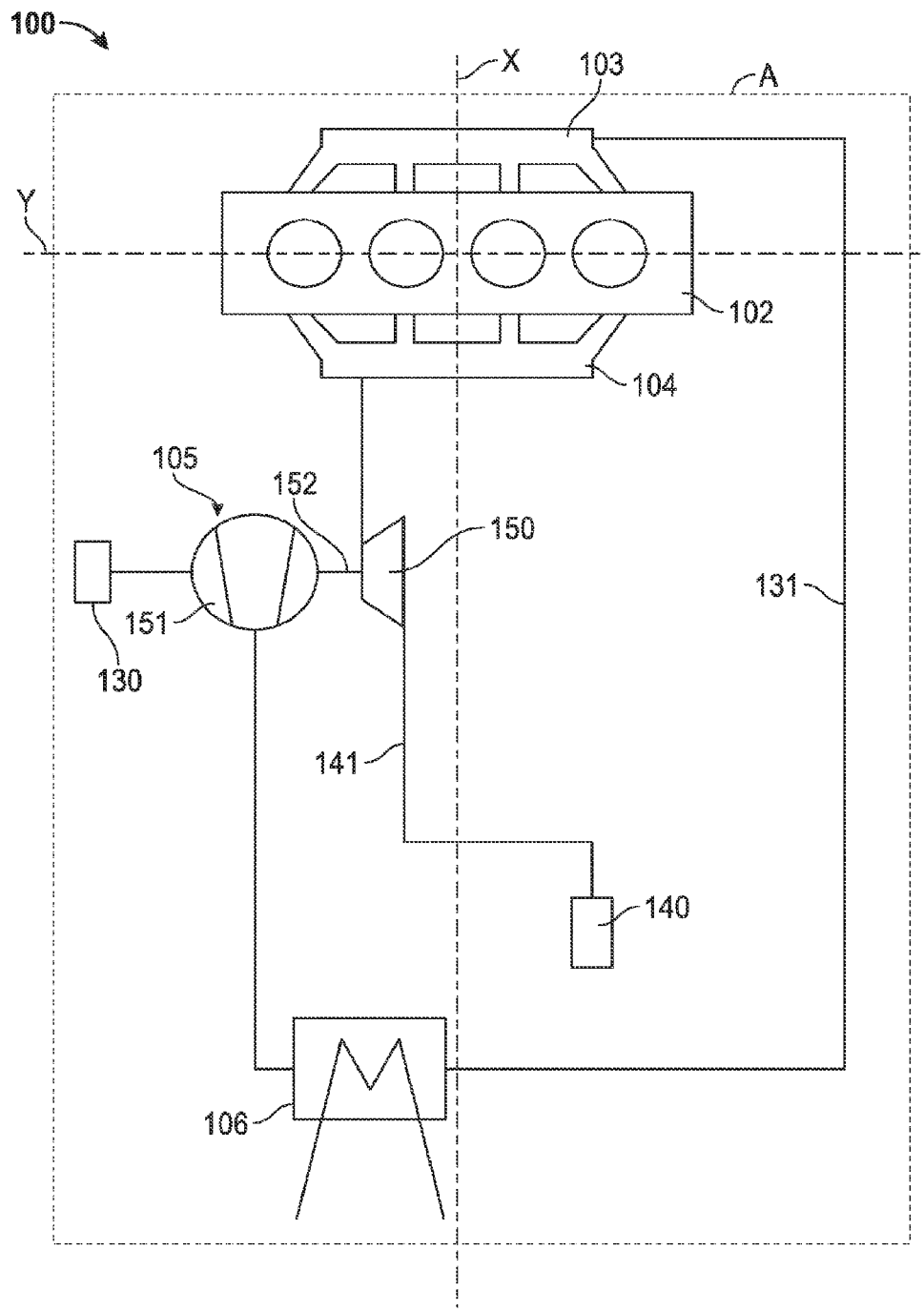
FIG. 1 is a schematic illustration of a single-stage turbocharged engine system of the prior art, which is installed into the engine compartment of a vehicle.

FIG. 1 schematically illustrates a single-stage turbocharged engine system 100 which is installed into the engine compartment A of a vehicle, according to the prior art. The single-stage turbocharged engine system 100 comprises an internal combustion engine 102, in this case a Diesel engine. The engine 102 have intake manifold 103 and exhaust manifold 104, each of which comprises a plurality of runners corresponding in number to the number of individual cylinder of the engine 102.

The engine 102 is oriented transversely relative to the longitudinal axis X of the vehicle, such that the intake manifold 103 is facing towards the rear part of the vehicle, and the exhaust manifold 104 is facing towards the front part of the vehicle. The intake manifold 103 communicates with an air inlet 130 via an intake line 131. The exhaust manifold 104 communicates with an exhaust outlet via an exhaust line 141.

The single-stage turbocharged engine system 100 comprises a single turbocharger 105 for charging air into the engine 102 at increased pressure. The single turbocharger 105 comprises a turbine 150 and a compressor 151, which is rotated by the turbine 150 through a connecting shaft 152. The turbine 150 is located in the exhaust line 141 between the exhaust manifold 104 and the exhaust outlet 140, for converting the exhaust gas heat to torque which is used to drive the compressor 151. The compressor 151 is located in the intake line 131 between the air inlet 130 and the intake manifold 103, for compressing the airflow and for providing it to the engine 102. An air cooler 106 is located in the intake line 131 downstream the compressor 151, for cooling airflow before entering the intake manifold 103.

The single turbocharger 105 is installed into the engine compartment A between the engine 102 and the front part of the vehicle, next to exhaust manifold 104, and is oriented such that the compressor 151 is located on engine left side (referring to FIG. 1). For reducing as much as possible the length of the intake line 131 and minimizing air pressure drop, the air inlet 130 is located on the left side of the engine 102 close to the compressor 151, and the air cooler 106 is located in the front part of the vehicle with its inlet facing left.

Figure 2:
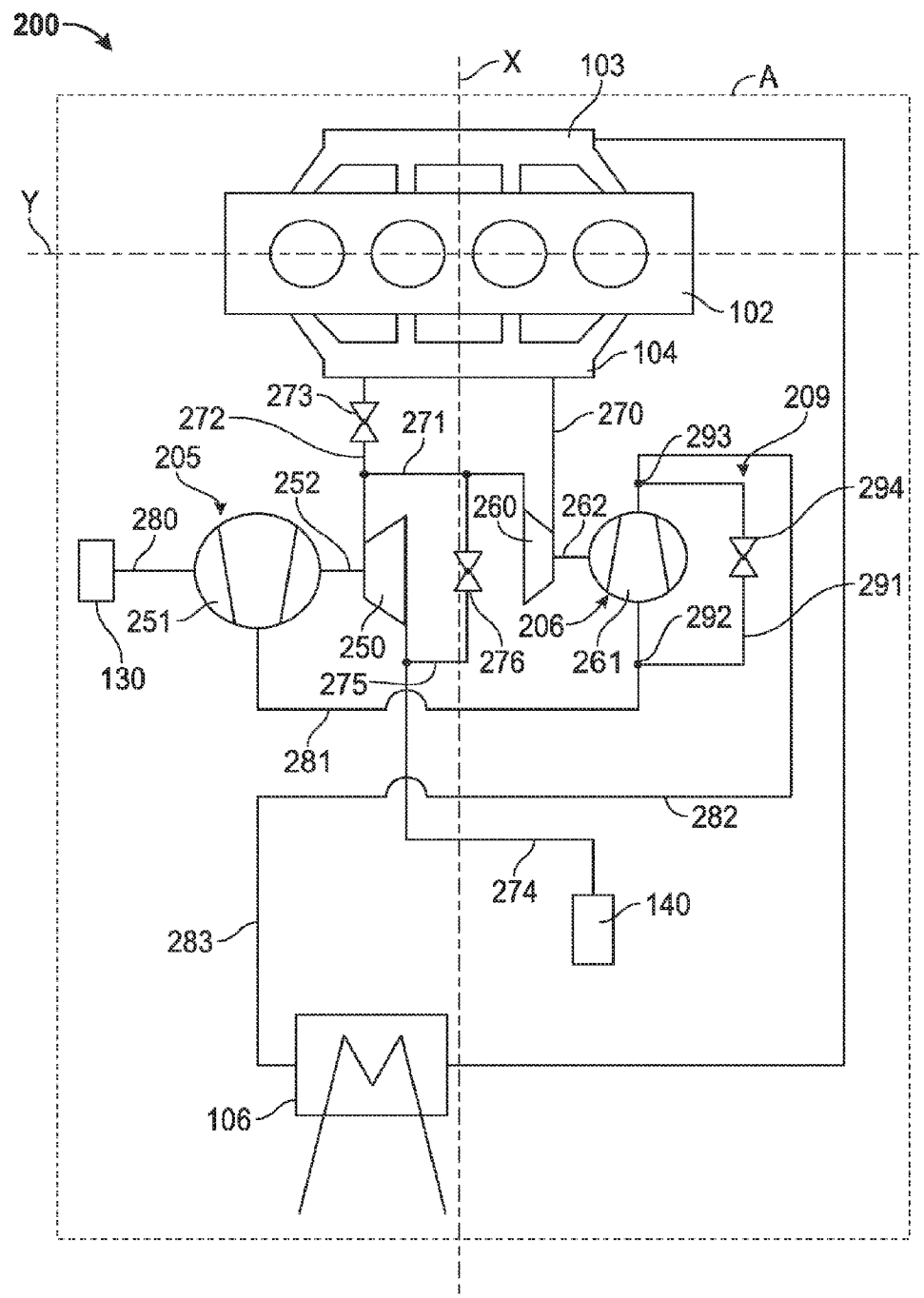
FIG. 2 is a schematic illustration of a two-stage turbocharged engine system according to EP 1 843 019, which is installed into the engine compartment of FIG. 1 according to an actual known implementation.

FIG. 2 schematically illustrates a two-stage turbocharged engine system 200 which is installed into the engine compartment A, according to an actual implementation. Since the engine compartment A is designed for the single-stage turbocharged engine system 100, the air inlet 130 and the air cooler 106 are located in the same positions, as well as engine 102 with its intake manifold 103 and exhaust manifold 104.

The two-stage turbocharged engine system 200 comprises a low-pressure turbocharger 205, having a low-pressure turbine 250 and a low-pressure compressor 251, which is rotated by the turbine low-pressure turbine through a connecting shaft 252. The two-stage turbocharged engine system 200 further comprises an high-pressure turbocharger 206, having an high-pressure turbine 260 and an high-pressure compressor 261, which is rotated by the turbine 260 through a connecting shaft 262. The turbochargers 205 and 206 are installed into the engine compartment A between the engine 102 and the front part of the vehicle, next to exhaust manifold 104.

The connecting shaft 252 of low-pressure turbocharger 205 is parallel and substantially aligned with the connecting shaft 262 of high-pressure turbocharger 206, and both are substantially parallel to the axis Y of the engine 102. The low-pressure turbine 250 and the high-pressure turbine 260 are facing towards each other, such that the low-pressure compressor 251 and the high-pressure compressor 261 are substantially located on opposite sides of the engine 102.

Referring to FIG. 2, the low-pressure compressor 251 and the high-pressure compressor 261 are located on engine left and right side respectively. The inlet of high-pressure turbine 260 communicates with the exhaust manifold 104 via a high-pressure exhaust line 270. The outlet of high-pressure turbine 260 communicates with the inlet of low-pressure turbine 250 via a low-pressure exhaust line 271. The inlet of low-pressure turbine 250 directly communicates with the exhaust manifold 104 via a short-cut line 272 leading into the low-pressure exhaust line 271.

The short-cut line 272 comprises a valve 273 for opening and closing the passageway. The outlet of low-pressure turbine 250 communicates with the exhaust outlet 140 via a muffler line 274. The muffler line 274 directly communicates with low-pressure exhaust line 271 via a bypass 275, which comprises a valve 276 for opening and closing the passageway.

The inlet of low-pressure compressor 251 communicates with the air inlet 130 via a connecting intake line 280. The outlet of low-pressure compressor 251 communicates with the inlet of the high-pressure compressor 261 via a low-pressure intake line 281, which extends transversely from the left side of the engine 102 towards the right side.

Since the high-pressure compressor 261 and the air cooler 106 are far from each other, with the inlet of air cooler 106 directed towards the opposite side relative to the high-pressure compressor 261, the outlet of the high-pressure compressor 261 communicates with the inlet of air cooler 106 via a long high-pressure intake line, which comprises a portion 282 extending transversely from the engine right side towards the engine left side, substantially parallel to the low-pressure intake line 281, in order to channel back the airflow to a neighborhood of the low-pressure compressor 251, and a final portion 283 leading to the intake of air cooler 106.

The two-stage turbocharged engine system 200 further comprises a bypass device 209 arranged for allowing the airflow to bypass the high-pressure compressor 261 when the high-pressure turbocharger 206 is disabled. The bypass device 209 comprises a short bypass line 291 for directly fluidly connecting a first branching point 292 of low-pressure intake line 281 to a second branching point 293 of high-pressure intake line 282-283, and a valve 294 located in said bypass line 291 for selectively opening or closing the passageway. The bypass device 209 is located close to high-pressure compressor 261. As a matter of fact, the first branching point 292 is located in the low-pressure intake line 281 immediately upstream the high-pressure compressor 261, and the second branching point 293 is located in the high-pressure intake line 282-283 immediately downstream the high-pressure compressor 261. Accordingly, the valve 294 is located very close to high-pressure compressor 261.

When the two-stage turbocharged engine system 200 is operating at low engine speed (for example 1250 rpm), the valve 294 of bypass device 209 is closed, and the intake air is charged by both low-pressure compressor 251 and high-pressure compressor 261 which are disposed in series. In other words, the system works according the two-stage operating mode. With increasing engine speed, the flow capacity of the high-pressure turbocharger 206 will be limited, thereby limiting further performance to be obtained.

The valve 273 opens the short-cut line 272, allowing part of the exhaust gas to flow from exhaust manifold 104 directly into low-pressure exhaust line 271. At the same time, the flow and pressure within high-pressure exhaust line 270 continue to energize the high-pressure turbocharger 206 to thereby cause charging pressure to be produced. The flow and pressure within low-pressure exhaust line 271 increases due to the flow and pressure from the short-cut line 272 and from the outlet of high-pressure turbine 260 to energize low-pressure turbocharger 205. Therefore, the pressure within high-pressure intake line 282 can be adjusted such that it does not exceed the allowed limit.

When the engine arrives, for example, at 3000 rpm, the opening area of valve 273 reaches a maximum, thus almost all of the exhaust gas flows through the short-cut line 272 into low-pressure exhaust line 271 to thereby lose the function of high-pressure turbocharger 206, while energizing low-pressure turbocharger 205 to thereby produce a predetermined charging pressure. In other words, the system works according the single-stage operating mode. At that time, valve 294 of bypass device 209 opens the bypass line 291 such that all the air discharged from low-pressure compressor 251 flows directly in the high-pressure intake line 282-283, bypassing the high-pressure compressor 261.

Since the high-pressure compressor 261 is bypassed locally by the bypass device 209, the intake air flows substantially through the entire low-pressure intake line 281 and the portion 282 of high-pressure intake line, both during two-stage operating mode and single-stage operating mode. Therefore, the pressure drop along the engine intake system is quite high in all operating modes. Moreover, the pipes forming the low-pressure intake line 281 and the portion 282 of high-pressure intake line must be dimensioned according to the maximum airflow which occurs during single-stage operating mode, such that they are generally oversized relative to the airflow involved during two-stage operating mode.

Figure 3:
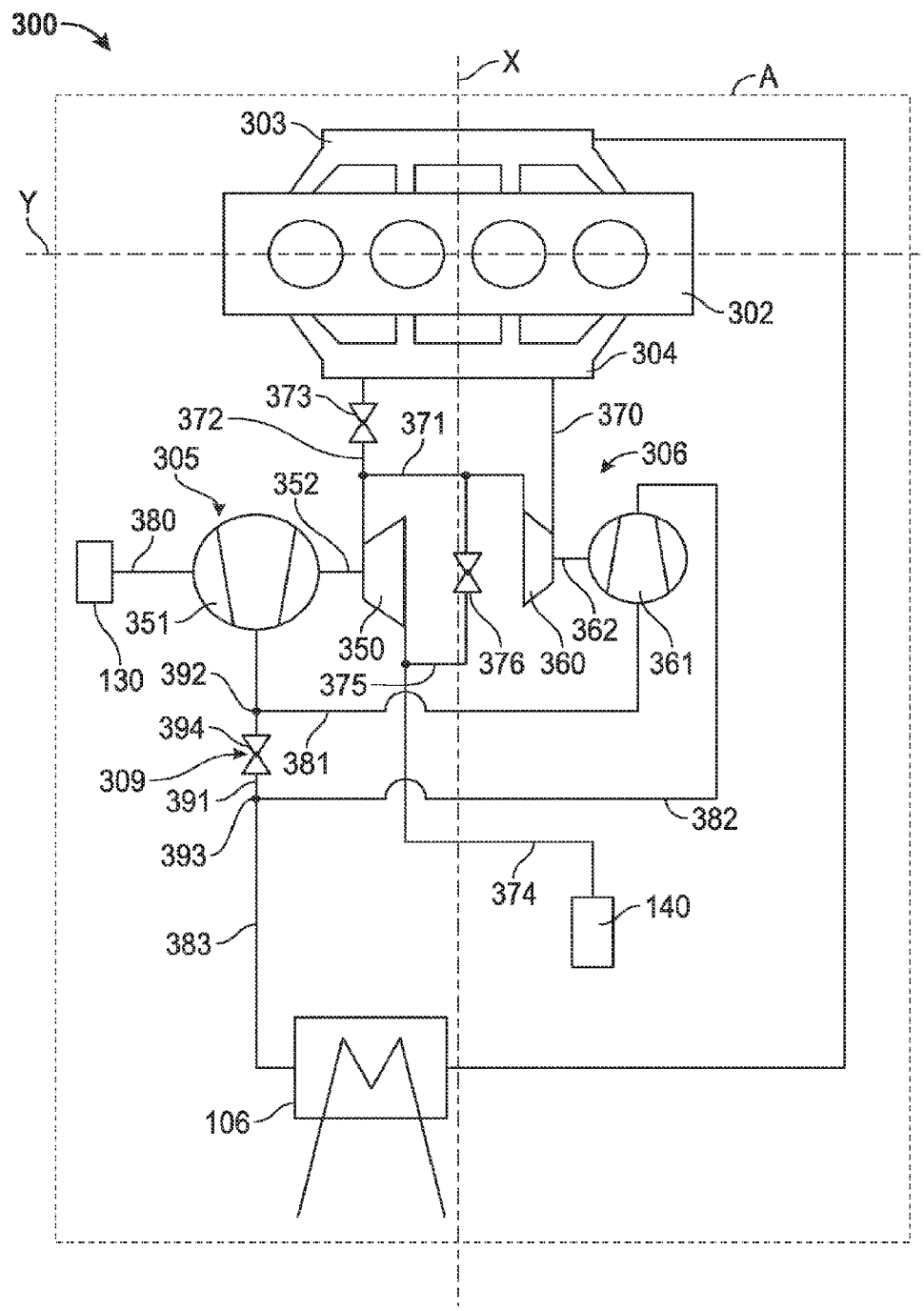
FIG. 3 is a schematic illustration of a two-stage turbocharged engine system according to an embodiment of the invention.

For solving or at least reducing the above mentioned drawbacks, embodiments of the invention provide an improved two-stage turbocharged engine system 300, a preferred embodiment of which is schematically illustrated in FIG. 3. The improved two-stage turbocharged engine system 300 is installed in the engine compartment A which is designed for the single-stage turbocharged engine system 100, such that the air inlet 130 and the air cooler 106 are located in the same positions.

Similar to the preceding embodiments, the improved two-stage turbocharged engine system 300 comprises an internal combustion engine 302, in this case a Diesel engine, having intake manifold 303 and exhaust manifold 304, each of which comprises a plurality of runners corresponding in number to the number of individual cylinder of the engine 302. The engine 302 is oriented transversely to the longitudinal axis X of the vehicle, with the intake manifold 303 facing towards the rear part of the vehicle and the exhaust manifold 304 facing towards the front part of the vehicle.

The improved two-stage turbocharged engine system 300 comprises a low-pressure turbocharger 305, having a low-pressure turbine 350 and a low-pressure compressor 351, which is rotated by the turbine 350 through a connecting shaft 352. The improved two-stage turbocharged engine system 300 further comprises an high-pressure turbocharger 306, having an high-pressure turbine 360 and a high-pressure compressor 361, which is rotated by the turbine 360 through a connecting shaft 362. The turbochargers 305 and 306 are installed into the engine compartment A between the engine 302 and the front part of the vehicle, next to exhaust manifold 304.

The connecting shaft 352 of low-pressure turbocharger 305 is parallel and substantially aligned with the connecting shaft 362 of high-pressure turbocharger 306, and both are substantially parallel to the axis Y of the engine 302. The low-pressure turbine 350 and the high-pressure turbine 360 are facing towards each other, such that the low-pressure compressor 351 and the high-pressure compressor 361 are substantially located on opposite sides of the engine 302.

Referring to FIG. 3, the low-pressure compressor 351 and the high-pressure compressor 361 are located on engine left and right side respectively. The inlet of high-pressure turbine 360 communicates with the exhaust manifold 304 via a high-pressure exhaust line 370, and the outlet of high-pressure turbine 360 communicates with the inlet of low-pressure turbine 350 via a low-pressure exhaust line 371. The inlet of low-pressure turbine 350 directly communicates with the exhaust manifold 304 via a short-cut line 372 leading into the low-pressure exhaust line 371. The short-cut line 372 comprises a valve 373 for opening and closing the passageway.

The outlet of low-pressure turbine 350 communicates with the exhaust outlet 140 via a muffler line 374, which directly communicates with the low-pressure exhaust line 371 via a bypass 375, which comprises a valve 376 for opening and closing the passageway. The inlet of low-pressure compressor 351 communicates with the air inlet 130 via a connecting intake line 380, and the outlet of low-pressure compressor 351 communicates with the inlet of the high-pressure compressor 361 via a low-pressure intake line 381, which extends transversely from the left side of the engine 302 to the right side (referring to FIG. 3). Since the high-pressure compressor 361 and the air cooler 106 are far from each other, with the inlet of air cooler 106 directed towards the opposite side relative to the high-pressure compressor 361, the outlet of the high-pressure compressor 361 communicates with the inlet of air cooler 106 via a long high-pressure intake line, which comprises a portion 382 extending transversely from the engine right side towards the engine left side, substantially parallel to the low-pressure intake line 381, in order to channel back the airflow to neighborhood of low-pressure compressor 351, and a final portion 383 leading to the intake of air cooler 106.

The improved two-stage turbocharged engine system 300 comprises a bypass device 309 arranged for allowing the airflow to bypass the high-pressure compressor 361 when the high-pressure turbocharger 306 is disabled. The bypass device 309 comprises a short bypass line 391 for directly fluidly connecting a first branching point 392 of low-pressure intake line 381 to a second branching point 393 of high-pressure intake line 382, 383, and a valve 394 located in said bypass line 391 for selectively opening or closing the passageway. The valve 394 can be automatic or externally actuated. According to an embodiment of the invention, the bypass device 309 is located close to low-pressure compressor 351.

As a matter of fact, the first branching point 392 is located in the low-pressure intake line 381 immediately downstream the low-pressure compressor 351, and the second branching point 393 is located at the end of the portion 382 of high-pressure intake line in the neighborhood of low-pressure compressor 351. Accordingly, the valve 394 is located very close to low-pressure compressor 351.

The operation of the improved two-stage turbocharged engine system 300 is substantially identical to the previously described two-stage turbocharged engine system 200. When the improved two-stage turbocharged engine system 300 is operating at high-engine speed, the high-pressure turbocharger 306 is disabled and the valve 394 of bypass device 309 opens the bypass line 391. The air discharged from low-pressure compressor 351 flows directly in the second portion 383 of the high-pressure intake line, thereby bypassing the major portion of the low-pressure intake line 381, the high-pressure compressor 361, and the portion 282 of the high-pressure intake line. As a matter of fact, the intake air flows through a shorter flow path compared to the actual two-stage turbocharged engine system 200, thereby reducing the pressure drop and consequently improving engine efficiency.

When the improved two-stage turbocharged engine system 300 is operating at low-engine speed, both the high-pressure turbocharger 306 and low-pressure turbocharger 305 are working and the valve 394 of bypass device 309 is closed. The airflow exiting the low-pressure compressor 351 is forced to go through the low-pressure intake line 381 towards the high-pressure compressor 361, and downstream through the first portion 382 of the high-pressure intake line, for returning back in the neighborhood of the low-pressure compressor 351 before reaching the air cooler 106. However, the airflow which is charged in the engine 302 during two-stage operating mode is generally smaller than the airflow involved in single-stage operating mode. Therefore, the pipes which forms the major portion of the low-pressure intake line 381 and the first portion 382 of the high-pressure intake line can have a smaller cross section, compared to the pipes which form the first intake line 380 and the second portion 383 of the high-pressure intake line, and in general compared to the pipes which form the low-pressure intake line 281 and the high-pressure intake line 282-283 of the actual two-stage turbocharged engine system 200. It follows that in the engine compartment A will be available additional free space.

Figure 4:
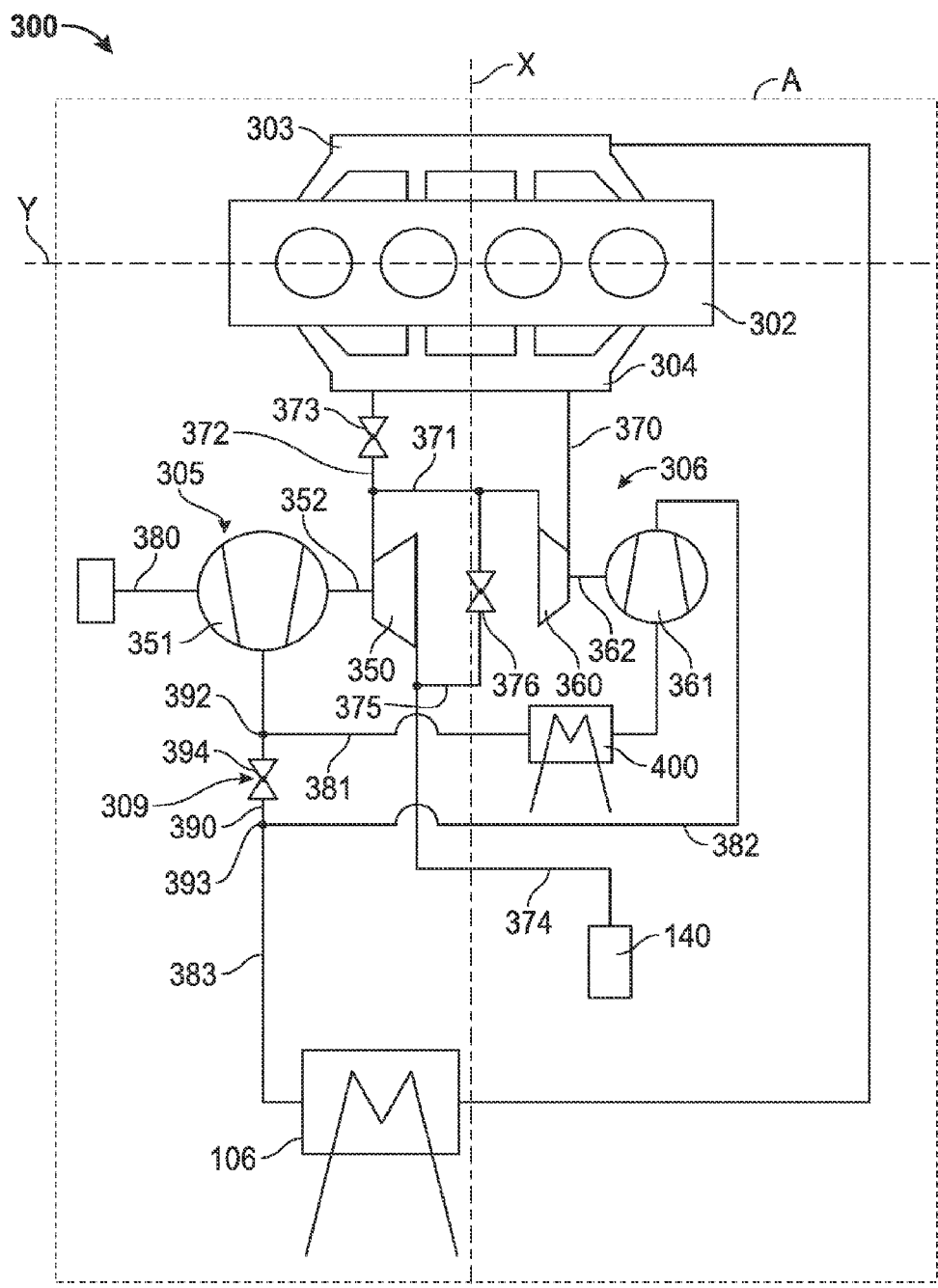
FIG. 4 is a schematic illustration of a different version of the two-stage turbocharged engine system according to an embodiment of the invention.
Figure 5:
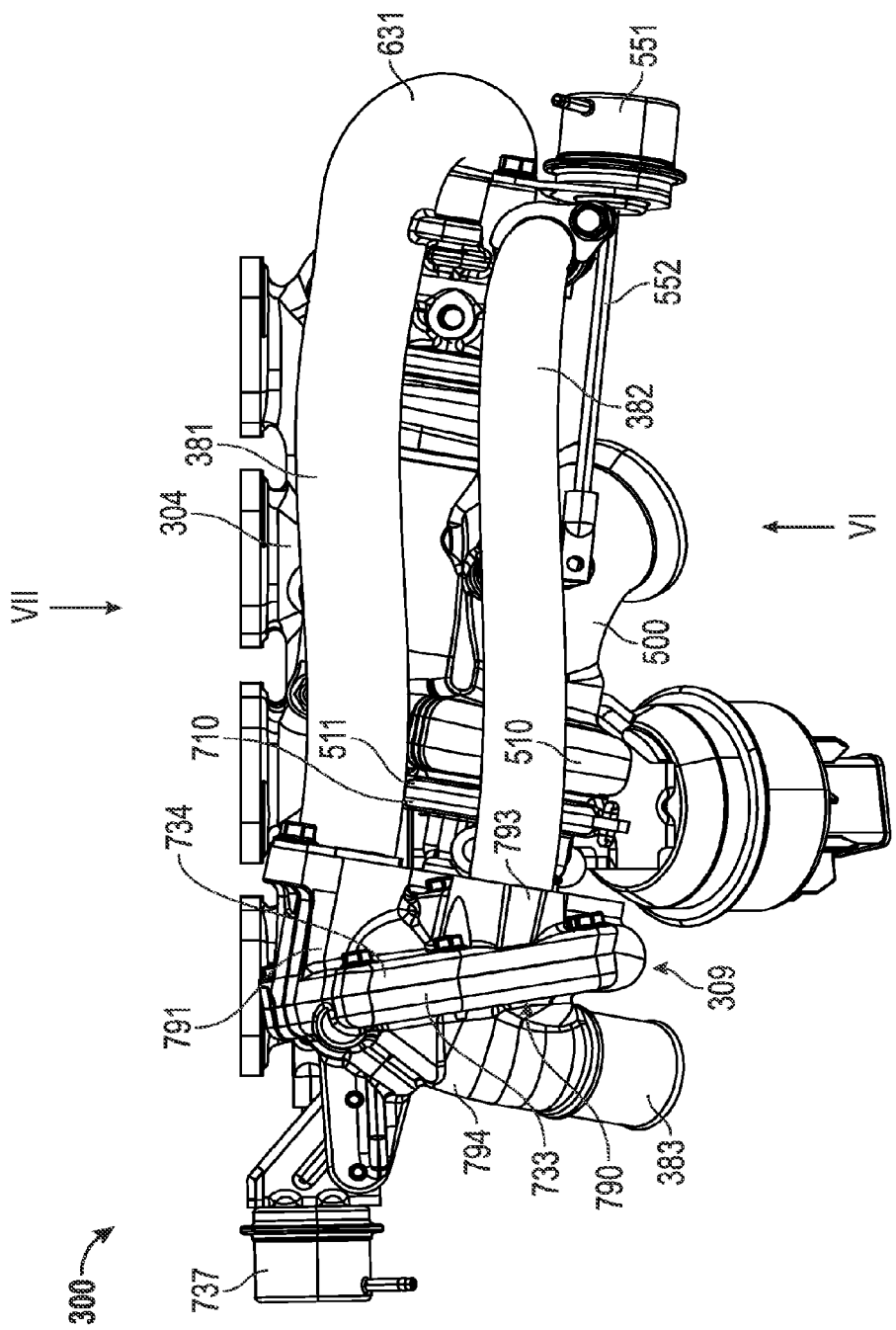
FIG. 5 is a view of a two-stage turbocharger system according to an embodiment of the invention.

Such additional free space is useful for a better heat rejection of the charging system during two-stage operation. Moreover, it is useful for accommodating a second air cooler 400 which can be eventually located in the low-pressure intake line 381, between bypass device 309 and high-pressure compressor 361, as schematically illustrated in FIG. 4.

Figure 6:
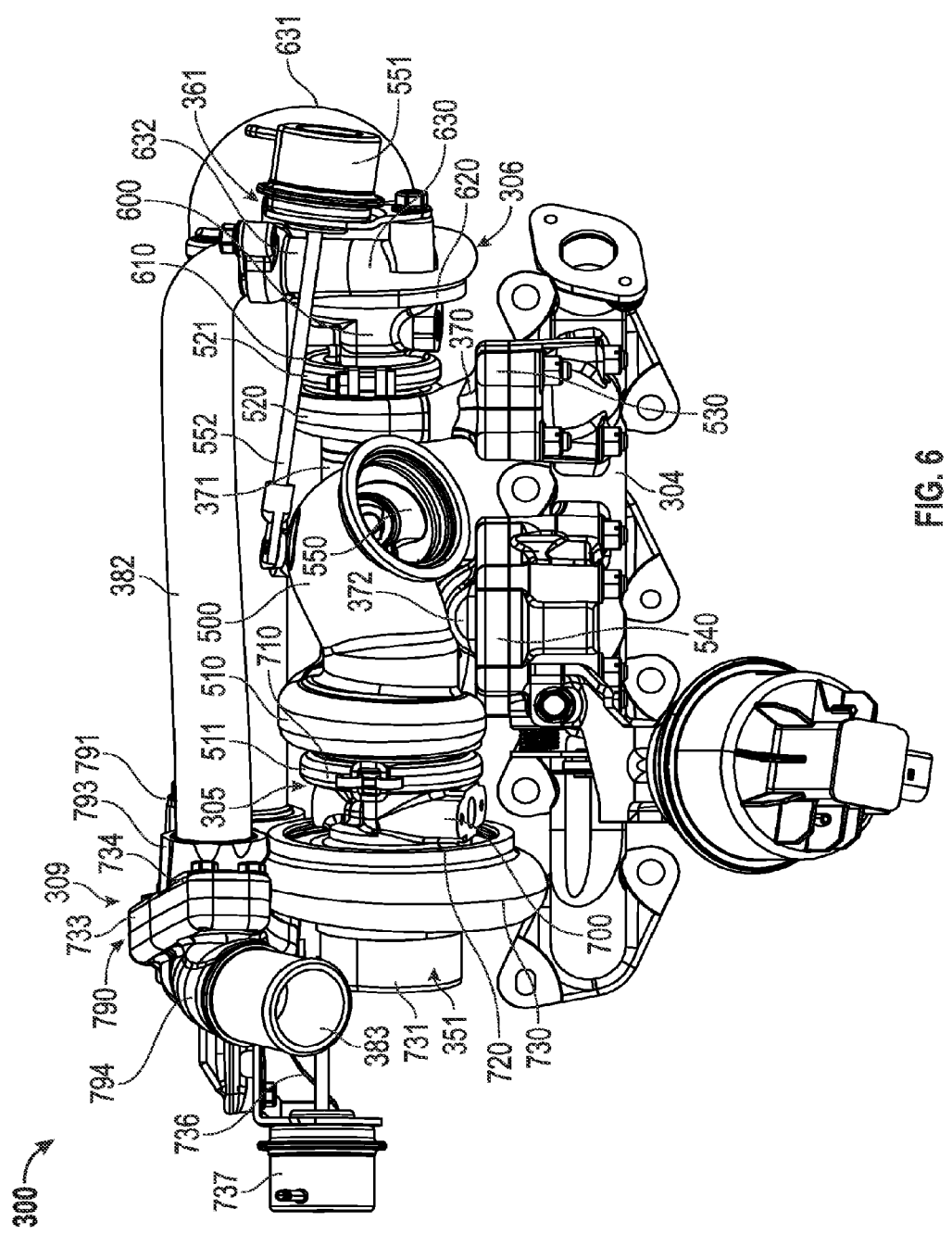
FIG. 6 is the view indicated with the arrow VI in FIG. 5.

As illustrated in FIG. 6, a two-stage turbocharged engine system 300 according to an embodiment of the invention comprises a turbine housing 500 which is provided as a single cast part and/or a single casting. The turbine housing 500 provides a low-pressure volute 510 for accommodating the turbine wheel of low-pressure turbocharger 305, and a high-pressure volute 520 for accommodating the turbine wheel of high-pressure turbocharger 306. Low-pressure volute 510 and high-pressure volute 520 comprises connecting flanges, respectively 511 and 521. High-pressure volute 520 communicates with the exhaust manifold 304 via the high-pressure exhaust line 370, which is comprised as a tangential channel in the turbine housing 500. Low-pressure volute 510 communicates with the exhaust manifold 304 via the short-cut line 372, which is comprised as a tangential channel in the turbine housing 500.

High-pressure exhaust line 370 and short-cut line 372 end with connecting flanges, respectively 530 and 540, which are fixed to corresponding flanges of the exhaust manifold 304. Low-pressure volute 510 and high-pressure volute 520 are communicating via the low-pressure exhaust line 371 which is comprised as a channel in the turbine housing 500. The valve 376 comprises a vent flap 550 located into the low-pressure exhaust channel 371, which is rotated by a pulse width modulated pneumatic actuator 551 through a lever 552.

The high-pressure turbocharger 306 comprises a bearing housing 600 for supporting the connecting shaft 362. The connecting shaft 362 protrudes from both sides of the bearing housing 600, for joining with the turbine wheel and compressor wheel respectively. The bearing housing 600 comprises connecting flanges 610 and 620, which are located at the turbine side and at compressor side respectively. The connecting flange 610 is fixed to the connecting flange 521 of the turbine housing 500.

The connecting flange 620 is fixed to a connecting flange of a high-pressure compressor housing 630, which is arranged for accommodating the high-pressure compressor wheel, in order to globally define the high-pressure compressor 361. The inlet of high-pressure compressor 361 is comprised as a curved channel 631 leading axially into the compressor housing 630. The outlet of high-pressure compressor 361 is comprised as a tangential channel 632 in the compressor housing 630.

The low-pressure turbocharger 305 comprises a bearing housing 700 for supporting the connecting shaft 352. The connecting shaft 352 protrudes from both sides of the bearing housing 700, for joining with the turbine wheel and compressor wheel respectively. The bearing housing 700 comprises connecting flanges 710 and 720, which are located at the turbine side and at compressor side respectively. The connecting flange 710 is fixed to the connecting flange 511 of the turbine housing 500.

Figure 7:
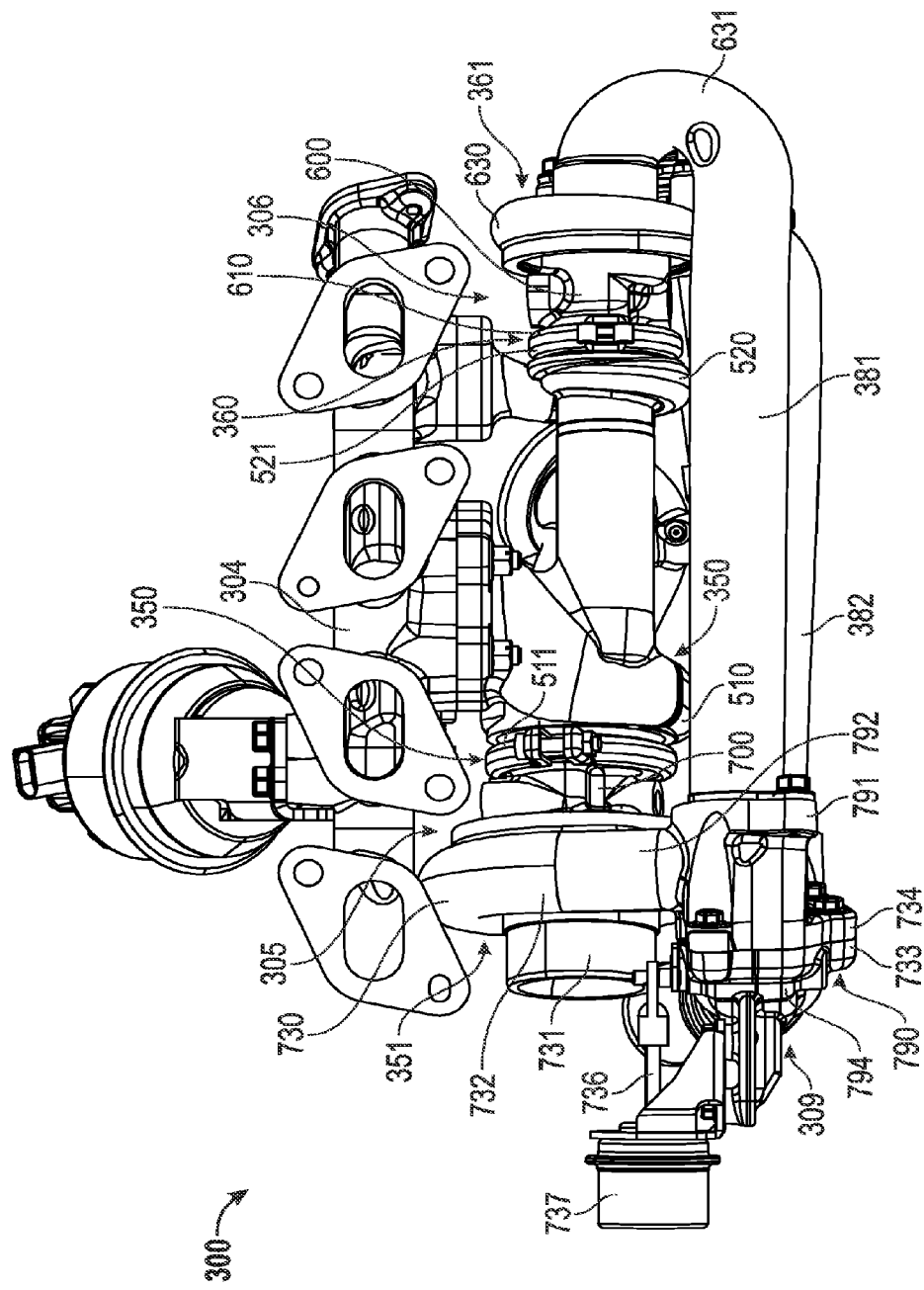
FIG. 7 is the view indicated with the arrow VII in FIG. 5.

The connecting flange 720 is fixed to a connecting flange of a low-pressure compressor housing 730, which is arranged for accommodating the low-pressure compressor wheel, in order to define the low-pressure compressor 351. The inlet of low-pressure compressor 351 is comprised as an axial channel 731 in the compressor housing 730. The outlet of low-pressure compressor 351 is comprised as a tangential channel 732 in the compressor housing 730 (FIG. 7).

Figure 8:
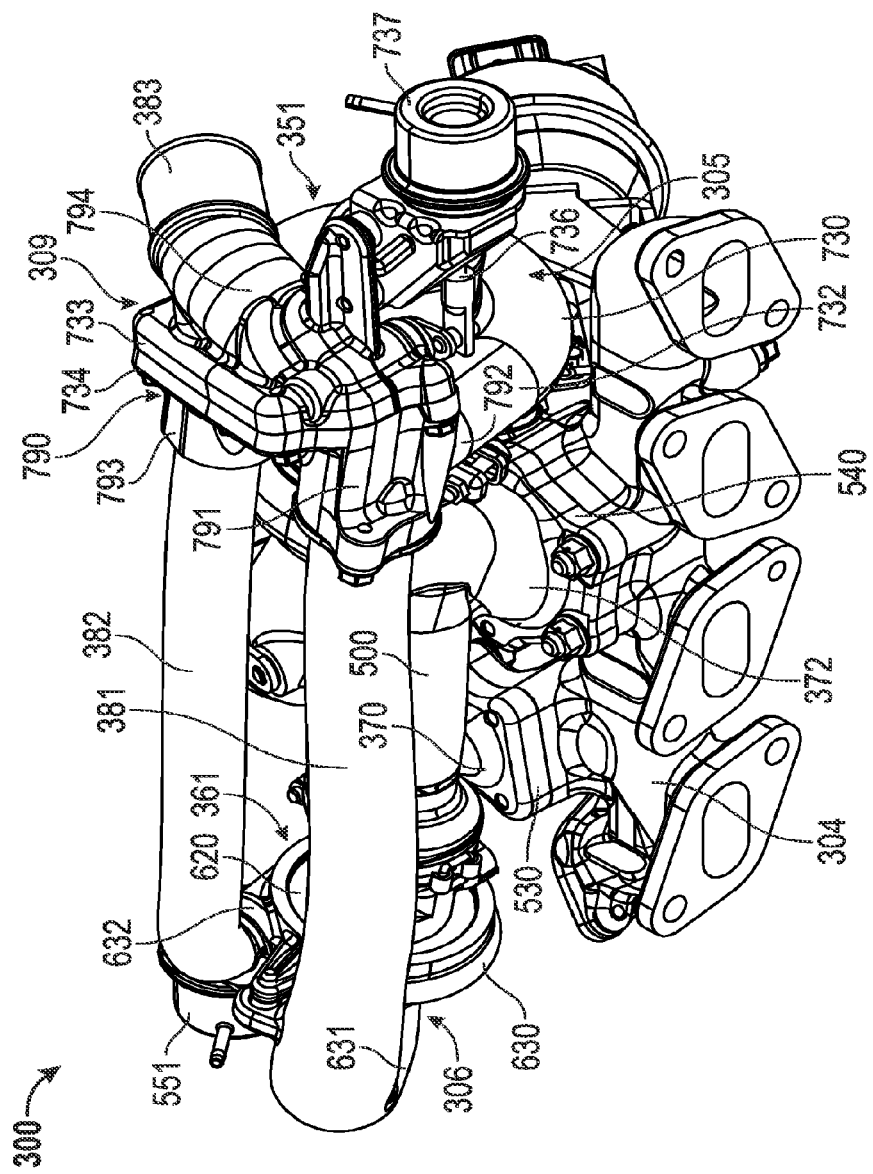
FIG. 8 is a prospective view of the two-stage turbocharger system of FIG. 5.

As shown in FIG. 8, the by-pass device 309 comprises a housing 790 which encloses an internal volume substantially defining the bypass line 391. The housing 790 comprises four channels which are labeled 791, 792, 793 and 794 respectively. The channel 791 communicates with the internal volume of the housing 790, and is hydraulically connected with the inlet of high-pressure compressor 361 via the low-pressure intake line 381, which is defined by an external pipe.

The channel 792 communicates with the outlet 732 of low-pressure compressor 351 and leads into an intermediate point of the first channel 791, to thereby defining the branching point 392 of the low-pressure intake line 381. The channel 793 communicates with the internal volume of the housing 790, and is hydraulically connected with the outlet 632 of high-pressure compressor 361 via the portion 382 of the high-pressure intake line, which is defined by an external pipe extending parallel to the low-pressure intake line 381.

The last channel 794 communicates with the internal volume of the housing 790, and is hydraulically connected with the air cooler 106 via the second portion 383 of the high pressure intake line 32, which is defined by an external pipe. The region in which the channels 793 and 794 lead into the internal volume of the housing 790 defines the branching point 393 of high-pressure intake line.

The valve 394 of the bypass device 309 comprises a vent flap located into the housing 790. The vent flap is rotated by an operating lever 736 which is actuated by a pulse width modulated pneumatic actuator 737, for selectively opening and closing the for selectively opening or closing the hydraulic communication between the first channels 791 and the internal volume of the housing 790. The operation of actuator 737 can by automatically controlled by the engine control unit (ECU), or can be manually commanded.

The bypass housing 790 comprises two separated portions which are fixed together by means of respective connecting flanges, which are labeled 733 and 734. The first portion of the housing 790 comprises the channels 791, 792 and 793, while the second portion of the housing 790 comprises the channel 794. According to a preferred embodiment, the first portion of the housing 790 is integral with the compressor housing 730 of the low-pressure compressor 351, which is the first portion of the housing 790 is in a single body with the compressor housing 730. In this way, a rational components arrangement in engine compartment is achieved.

While the present invention has been described with respect to certain preferred embodiments and particular applications, it is understood that the description set forth herein above is to be taken by way of example and not of limitation. Those skilled in the art will recognize various modifications to the particular embodiments are within the scope of the appended claims. Therefore, it is intended that the invention not be limited to the disclosed embodiments, but that it has the full scope permitted by the language of the following claims. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A two-stage turbocharged engine system, comprising:
    an internal combustion engine;
    a high-pressure turbocharger having a high-pressure turbine for rotating a high-pressure compressor through a connecting shaft;
    a low-pressure turbocharger having a low-pressure turbine for rotating a low-pressure compressor by means of a second connecting shaft;
    a low-pressure intake line for fluidly connecting the outlet of the low-pressure compressor to the inlet of the high-pressure compressor;
    a high-pressure intake line for fluidly connecting the outlet of the high-pressure compressor to an air cooler; and
    a bypass device for selectively fluidly connecting a first branching point located in the low-pressure intake line to a second branching point located in the high-pressure intake line to thereby bypass the high-pressure compressor, and
    wherein the bypass device is located closer to the low-pressure compressor than to the high-pressure compressor.

2. The two-stage turbocharged engine system according to claim 1, wherein the first branching point and the second branching point are located closer to the low-pressure compressor than to the high-pressure compressor.

3. The two-stage turbocharged engine system according to claim 1, wherein the bypass device comprises:
    a bypass housing,
    wherein the first branching point and the second branching point are comprised as hydraulically interconnected conducts in the bypass housing.

4. The two-stage turbocharged engine system according to claim 3, wherein the low-pressure compressor comprises:
    a low-pressure compressor housing for accommodating a compressor wheel,
    wherein the bypass housing is directly fixed to the low-pressure compressor housing.

5. The two-stage turbocharged engine system according to claim 4, wherein at least a portion of the bypass housing is integral with the low-pressure compressor housing.

6. The two-stage turbocharged engine system according to claim 1, wherein the high-pressure intake line comprises:
    a first portion for channeling back an airflow from the outlet of the high-pressure compressor to a neighborhood of the low-pressure compressor.

7. The two-stage turbocharged engine system according to claim 6, wherein the first branching point is located in the low-pressure intake line immediately downstream the outlet of the low-pressure compressor, and the second branching point is located at an end of the first portion of the high-pressure intake line.

8. The two-stage turbocharged engine system according to claim 7, wherein the first branching point is defined by a three-way junction which directly communicates with the outlet of the low-pressure compressor.

9. The two-stage turbocharged engine system according to claim 7, wherein the low-pressure intake line comprises:
    at least a pipe for fluidly connecting the first branching point to the inlet of the high-pressure compressor,
    wherein the high-pressure intake line comprises
        a first pipe for fluidly connecting the outlet of the high-pressure compressor to the second branching point, and
        a second pipe for fluidly connecting the second branching point to the inlet of the air cooler.

10. The two-stage turbocharged engine system according to claim 9, wherein each of the second pipe of the low-pressure intake line and the first pipe of the high-pressure intake line has a cross section being smaller than a cross section of the second pipe of the high-pressure intake line.

11. The two-stage turbocharged engine system according to claim 1, further comprising:
    a single turbine housing for accommodating a turbine wheel of both the high-pressure turbocharger and the low-pressure turbocharger.

12. The two-stage turbocharged engine system according to claim 1, further comprising:
    a second air cooler which is located in the low-pressure intake line between the bypass device and the high-pressure compressor.

13. The two-stage turbocharged engine system according to claim 1, wherein the bypass device comprises:
    a bypass line for fluidly connecting the first branching point located in the low-pressure intake line to the second branching point located in the high-pressure intake line, and
    a valve for selectively opening and closing the bypass line.

14. The two-stage turbocharged engine system according to claim 13, wherein the valve comprises:
    a movable flap for selectively opening and closing the bypass line.

15. The two-stage turbocharged engine system according to claim 14, further comprising:

a pneumatic actuator for moving the movable flap between an open and a closed position.

* * * * *